United States Patent Office 3,486,189
Patented Dec. 30, 1969

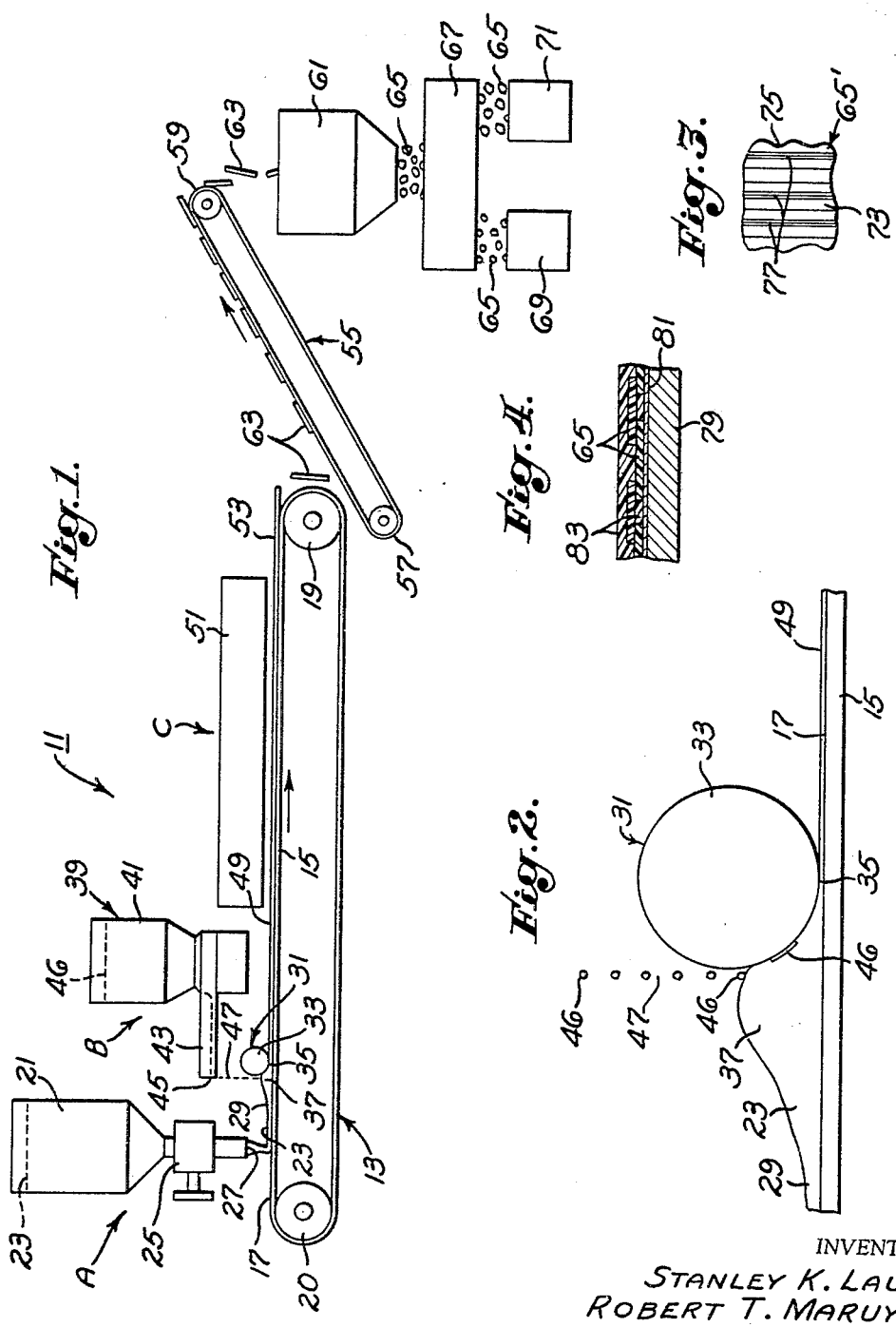

3,486,189
APPARATUS FOR MAKING STRIATED
PLASTIC CHIPS
Stanley K. Lau and Robert T. Maruyama, Los Angeles,
Calif., assignors to Torginol of America, Inc., Los
Angeles, Calif., a corporation of California
Filed Dec. 28, 1965, Ser. No. 516,982
Int. Cl. B29c 21/06
U.S. Cl. 18—4                                                          6 Claims

ABSTRACT OF THE DISCLOSURE

An apparatus is disclosed for the production of a striated chip in which a fluid film-forming material is deposited on a conveying surface, the deposited layer of film-forming material is moved with the conveying surface past a doctor blade which restrains an upper portion of the layer to form a puddle while permitting a lower portion to move beneath the doctor blade, a pigment is deposited in the puddle of film-forming material just upstream of the doctor blade to cause a striated pattern in the film-forming material as it moves downstream under the doctor blade, and the resultant striated film-forming material is dried and broken into chips.

This invention relates to striated colored resinous chips, to a method and apparatus for making such chips, and a surface covering produced from the chips.

Floors or floor coverings with seams possess many inherent disadvantages. For example, the conventional floor tile takes considerable time for installation and requires a skilled workman to neatly install it, and the use of such tile results in much wasted material due to the cutting of the tile to fit in corners and around the edges of the room. The seams between adjacent tile trap dirt, thereby presenting a difficult cleaning problem. Also, adjacent tile may shift relative to each other after installation. As a result of these inherent disadvantages of seamed flooring, seamless floors are currently enjoying ever increasing popularity.

Seamless floors may be produced by the basic steps of coating a substrate or floor with an organic resin, applying a layer or layers of colored chips to the organic resin, removing the excess chips after the organic resin has solidified, and applying a coat or coats of an organic resin over the floor-covering chips to seal the surface and provide a clear smooth walking surface. This process for forming seamless surface coverings may be applied to horizontal or vertical surfaces and may be applied to various types of substrates.

The chip is the primary decorative element of the seamless surface covering. As the chips are opaque and colored, they provide a decorative layer over the substrate.

An object of this invention is to provide a decorative chip having color striations therein.

Another object of this invention is to provide a decorative chip of one shade or color and having striations of another shade or color formed therein.

Another object of this invention is to provide a chip having a thin integral body about .005 inch thick, the body having a pigment forming color striations therein, each of the striations extending substantially completely throughout the entire thickness of the chip.

A further object of this invention is to provide a method and apparatus for making a decorative striated surface-covering chip.

Another object of this invention is to provide a method and apparatus for introducing a pigment into a layer of fluid film-forming material in a striated pattern to produce a striated material.

A further object of this invention is to provide a method of making striated material from a fluid film-forming material including the steps of: forming a layer of the fluid film-forming material on a conveying surface; moving the conveying surface and the layer of fluid film-forming material along a predetermined path; depositing a pigment on the layer of fluid film-forming material; introducing the pigment into the layer of fluid film-forming material in such a way as to produce a striated pattern in the layer of fluid film-forming material; and subsequently drying the striated layer of fluid film-forming material to form a dry striated material.

Another object of the invention is to break the dry striated material into relatively small, irregularly shaped chips.

Another object of this invention is to introduce the pigment into the layer of fluid film-forming material by placing a doctor blade above the conveying surface, thereby restraining movement of an upper portion of the layer while permitting a lower portion of the layer to move beneath the doctor blade and downstream with the conveying surface, the pigment being carried beneath the doctor blade and introduced thereby ito the layer in a striated pattern.

A further object of this invention is to deposit the pigment shortly prior to or immediately upstream from the doctor blade so that the pigment will not have a sufficient period of time to thoroughly mix with the fluid film-forming material before passing beneath the doctor blade.

More particularly, an object of this invention is to utilize the doctor blade to form a puddle of the fluid film-forming material immediately upstream therefrom and to deposit the pigment on such puddle.

Still another object of this invention is to utilize pigments which will not readily dissolve in the fluid film-forming material thereby facilitating the formation of streaks or striations in the chip rather than uniformly changing the color thereof. More particularly, an object of this invention is to utilize a water-insoluble pigment when the fluid film-forming material is an emulsion such as polyvinyl acetate in water.

Another object of this invention is to utilize a pigment which is dry when it is deposited on the fluid film-forming material.

The invention, both as to its organization and method of operation, together with further objects and advantages thereof, may best be understood by reference to the following description taken in connection with the accompanying drawing in which:

FIG. 1 is a diagrammatic side elevational view of an apparatus for making a striated chip;

FIG. 2 is an enlarged diagrammatic fragmentary, side elevational view of the fluid surface-covering material as it passes beneath the doctor blade, with the space between the doctor blade and conveying surface being enlarged for clarity;

FIG. 3 is a plan view of a typical striated chip constructed in accordance with the teachings of this invention; and FIG. 4 is a sectional view through a typical floor in which a layer or layers of the chips of this invention have been employed.

Referring to the drawing and in particular to FIG. 1 thereof, reference numeral 11 designates an apparatus for making decorative striated chips. The apparatus 11 includes a conveyor 13 comprising an endless conveyor belt 15 having a horizontal conveying surface 17 and driven by a pulley 19. The conveyor belt 15 may be supported by a pulley 20 and/or other supporting means (not shown). The pulley 19 drives the conveyor belt 15 in the direction indicated by the arrow in FIG. 1.

Three stations A, B, and C are spaced along the conveyor 13 in the direction of movement of the upper half of the conveyor belt 15. A supply tank 21 containing a fluid film-forming material 23 is provided at station A. The fluid material 23 is metered by a metering valve 25 through a nozzle or orifice 27 onto the conveying surface 17. Of course, the orifice 27 may have any desired width so that the fluid film-forming material 23 may be deposited over the entire, or any portion of, the width of the conveyor belt 15.

The film-forming material 23 may be of various consistencies or viscosities when it is deposited on the conveyor belt 15. The important feature is that the consistency of the film-forming material 23 must be such that it is pourable or flowable through the orifice 27. Film-forming materials possessing such consistencies are designated herein as fluid or flowable film-forming materials. It is also desirable that the material 23 be capable of forming a film.

Various mixtures and compositions may be used for the fluid material 23. Broadly, the material 23 may consist of a resinous material having fillers and additives. By way of illustration, one preferred material consists of an emulsion of polyvinyl acetate and water, a filler such as barytes or talc, a pigment such as titanium oxide (TiO$_2$), surfactants such as potassium tripolyphosphate, water, and release agents such as castor oil and mineral spirits. By way of illustration, these materials may be present in the following proportions:

|   | Percent |
|---|---|
| Polyvinyl acetate emulsion (50% solids) | 26 |
| Barytes and talc | 62 |
| Titanium dioxide | 2.5 |
| Potassium tripolyphosphate | .3 |
| Water | 7.2 |
| Castor oil and mineral spirits | 2 |

With the valve 25 metering quantities of the fluid material 23 onto the moving conveyor belt 15, a relatively thick layer 29 of the fluid material is deposited. A doctor blade or obstructing member 31 is positioned downstream of the orifice 27 at the station B. The doctor blade 31 extends transversely across the conveyor belt 15 and is preferably generally perpendicular to the direction of movement of the upper half of the conveyor belt.

As best seen in FIG. 2, the doctor blade 31 may be a generally cylindrical bar 33 having a peripheral surface 35 which normally engages the conveying surface 17 when none of the material 23 is adjacent the doctor blade. The conveyor belt 15 is unsupported immediately beneath the doctor blade 31 so that when the conveyor 13 is running some of the material 23 is carried therewith and urges the conveyor belt downwardly a small distance to permit passage of the material beneath the doctor blade. The amount of downward movement of the conveyor belt 15 depends on the viscosity of the material 23. In FIG. 2, the space or displacement between the surfaces 17 and 35 is exaggerated for clarity. The doctor blade restrains movement of an upper portion of the layer 29 while permitting a lower portion of the layer to move downstream with the conveying surface 17 to the station C. Because movement of the layer 29 is restrained, a build-up or puddle 37 of the fluid material is formed immediately upstream from and in contact with the doctor blade 31.

Depositing means such as a vibratory feeder 39 is also positioned at station B. The vibratory feeder 39 includes a hopper 41 having a generally horizontal trough 43 affixed thereto. The trough 43 has a discharge end 45 which is preferably positioned vertically above the puddle 37. The hopper 41 contains a pigment or pigments 46 which are fed by the vibratory feeder 39 through the trough 43 and is caused to fall over the discharge end 45 in a curtain 47 onto the puddle 37. Of course, the trough 43 may be of appropriate width to cover the entire width of the puddle 37.

The pigment 46 is carried with the fluid material 23 beneath the doctor blade 31 which introduces the pigment into the layer of fluid material in a striated pattern to produce a striated sheet or layer 49 of fluid film-forming material. The words "striated" and "striations" as used herein have reference to generally parallel lines or streaks of color or pigment and do not connote grooves or a particular surface contour. Thus, the doctor blade 31 meters the fluid material 23 on the conveyor belt 15, forms the puddle 37, and causes the pigment 46 to produce the striated layer 49.

It is important that the pigment 46 and the layer 29 not be given a significant opportunity to mix prior to the time that they boh pass beneath the doctor blade 31. With this objective in mind, it has been found desirable to deposit the pigment 46 closely adjacent to and upstream from the doctor blade 31. More particularly, most advantageous results have been obtained when the pigment 46 is deposited on the puddle 37 which is contiguous to the doctor blade 31. Thus, the pigment 46 and the fluid material 23 are in a relatively unmixed state when they pass beneath the doctor blade 31. Movement of the pigment 46 and the fluid material 23 beneath the doctor blade 31 causes the pigment 46 to mix into the fluid material in a streaked pattern without permitting thorough mixing of the two. Thus, the layer 49 is striated rather than evenly tinted by the pigment. It has been found that the color striations produced by this method and apparatus extend substantially completely throughout the entire thickness of the layer 49.

The striated layer 49 is moved by the conveyor belt 15 to the station C at which is positioned an infrared heater 51 which dries the layer 49 to form a striated material or film 53. The striated film 53 is no longer "fluid" but is dried to a solid and in many instances, depending upon the composition of the fluid surface-covering material 23, will be somewhat friable.

A second conveyor 55 having lower and upper ends 57 and 59, respectively, is disposed adjacent to the conveyor 13 and is inclined upwardly. The lower end 57 is positioned beneath the right-hand end of the conveyor 13 and the upper end 59 has a chopper 61 therebelow. The striated surface covering 53 may break under its own weight or upon impact with the conveyor 55 into a plurality of fragments or large chips 63 as it is transferred from the conveyor 13 to the conveyor 55. The conveyor 55 moves the fragments 63 upwardly as indicated by the arrow in FIG. 1 until they fall off the upper end 59 into the chopper 61 which breaks or chops the fragments 63 into small chips 65. The chips 65 fall from the chopper 61 into a separator 67 which segregates the chips according to size and allows them to fall into appropriate containers 69 and 71. In the embodiment illustrated, the chips are segregated by the separator 67 into two size ranges which are deposited in containers 69 and 71, respectively.

FIG. 3 illustrates a typical integrally formed chip 65′. The chip 65′ has substantially parallel planar faces 73 (only one being shown) and an irregular periphery 75. The maximum dimension across one of the faces 73 of the chip 65′ will usually be from about one-fourth inch to about one-half inch. The striated film 53 and the chip 65′ are preferably about .005 inch thick. The chip 65′ has a plurality of narrow parallel randomly spaced streaks or color striations 77 each of which preferably extends throughout the entire thickness of the chip and completely throughout the length of the chip. This is an important feature of the chip 65′ in that is provides a decorative striated pattern on both faces of the chip. Thus, in making a seamless floor, the chips may be freely scattered on the substrate without regard to which of the faces 73 is facing outwardly.

The pigment 46 should not be of the type which will mix immediately or dissolve upon contact with the layer 29 of fluid material. Thus, when the material 23 contains water, the pigment 46 should preferably be water-insoluble. Dry or powdered pigments are preferred because they usually will float on the layer 29 until the pigment is agitated or forced into the layer 29. The following dry, inorganic pigments have produced very good results:

Red oxide ($Fe_2O_3$)
Pure yellow iron oxide ($Fe_2O_3 \cdot H_2O$)
Pure black iron oxide ($Fe_2O_3 + FeO$)
Pure chromium oxide green ($Cr_2O_3$)
Raw umber ($Fe_2O_3$, 44–49%; $MnO_2$, 7%; silica and silicate minerals)
Burnt umber ($Fe_2O_3$, 49–54%; $MnO_2$, 10%; silica and silicate minerals)
Chrome yellow light ($PbCrO_4$, 68%; $PbSO_4$, 32%)
Molybdate orange ($PbCrO_4 \cdot PbSO_4 \cdot PbMoO_4$)

Other pigments which are not completely inorganic but have also been found to produce good results are:

Monastral green B (chlorinated copper phthalocyanine)
Monastral blue B (copper phthalocyanine).

Mixtures of the pigments set forth above may be used to obtain other colors and shades.

FIG. 4 shows a substrate 79 to which a layer or layers of the chips 65 have been adhered by a layer of adhesive material such as an organic resin 81. The substrate 79 may be a floor, a wall, or almost any solid backing which will support the chips 65. In making the structure shown in FIG. 4, the organic resin 81 is first applied to the substrate 79 and then the chips 65 are scattered on the resin. After the resin has cured, a layer or layers of clear organic resin 83 are applied to the chips to provide a smooth walking surface. The striated chips 65 are visible through the clear resin 83. The chips 65 are opaque and completely cover the floor 79 and provide an attractive surface therefor.

Thus, the present invention provides a novel method and apparatus for making a novel decorative striated chip. By utilizing a pigmented fluid material 23 that is in the supply tank 21, and adding a second different pigment 46, the resulting chips will have striations of a different color or shade than the film-forming material 23.

What is claimed is:

1. In an apparatus for making a striated material from a fluid film-forming material, the combination of:
   conveyor means having a plurality of stations therealong;
   means for depositing a layer of the fluid film-forming material on said conveyor means at a first of said stations, said conveyor means moving said layer downstream;
   means for depositing a pigment on said layer of fluid film-forming material at a second of said stations;
   means adjacent said conveyor means for introducing said pigment into said layer in a striated pattern to produce a striated layer of fluid film-forming material, said introducing means including an obstructing member positioned above said conveyor means downstream of said second station, said obstructing member being adapted to engage said moving layer to form a substantially even sheet of the film-forming material downstream from said obstructing member, and a puddle of the fluid film-forming material immediately upstream therefrom, and wherein said pigment depositing means deposits the pigment on the puddle; and
   means for solidifying said striated layer to produce the striated material.

2. A combination as defined in claim 1 wherein said obstructing member includes a doctor blade.

3. A combination as defined in claim 1 wherein said solidifying means includes an infrared heater above said conveyor means and downstream of said introducing means.

4. A combination as defined in claim 1 wherein said film-forming material is a resinous material and including means for forming said striated material into a plurality of striated resinous chips.

5. A combination as defined in claim 4 including a separator for segregating the chips by size into at least two groups and at least two containers beneath said separator for receiving the two groups of chips.

6. A combination as defined in claim 4 wherein said conveyor means includes a conveyor belt, said solidifying means includes heating means above and downstream of said obstructing member, and said forming means includes a chopper.

References Cited

UNITED STATES PATENTS

| 2,914,807 | 12/1959 | Robbins | 264—140 XR |
| 3,015,356 | 1/1962 | White et al. | 264—76 |
| 3,396,067 | 8/1968 | Schafer | 161—5 |
| 3,405,425 | 10/1968 | Buckley et al. | 161—5 XR |
| 2,145,887 | 2/1939 | Moss et al. | 264—77 |
| 2,314,062 | 3/1943 | Alvey et al. | 264—76 |
| 2,987,102 | 6/1961 | Heinrichs | 161—5 |
| 3,012,901 | 12/1961 | Reese | 117—21 |
| 3,020,584 | 2/1962 | Brakeley | 264—76 |
| 3,056,224 | 10/1962 | Almy et al. | 161—5 |
| 3,133,848 | 5/1964 | Proctor et al. | 156—282 |
| 3,239,364 | 3/1966 | Carlisle et al. | 117—9 |
| 3,360,414 | 12/1967 | Tuthill | 156—264 |
| 3,383,442 | 5/1968 | Mountain | 264—74 |

ROBERT F. BURNETT, Primary Examiner

W. A. POWELL, Assistant Examiner

U.S. Cl. X.R.

161—5, 6, 162, 413; 156—242, 265, 298, 300, 500; 117—33; 118—308; 264—73, 140, 247, 255; 18—15